3,189,465
COOL TASTING MARGARINE
Henry Bowen Oakley, Bebington, and Timothy James Guffick, Birkenhead, England, assignors to Lever Brothers Company, New York, N.Y., a corporation of Maine
No Drawing. Filed May 7, 1962, Ser. No. 192,961
Claims priority, application Great Britain, May 15, 1961, 17,596/61
11 Claims. (Cl. 99—122)

This invention relates to fat products and in particular to margarine and to fat mixtures suitable for the preparation thereof.

A characteristic of butter that contributes towards its palatability is the sensation of coolness it produces on the tongue. This has a physical basis in the relatively high rate at which heat is absorbed when the butter melts, and on the quickness and completeness with which the margarine melts in the mouth (it should be thin melting as well as quick melting). The magnitude of the cooling effect can be assessed by matching the cool sensation in the mouth with a sample of edible oil (e.g. groundnut oil) cooled two or three degrees below the temperature of the margarine being tested. For example butter at 15° C. may match in cool sensation oil at 11 or 12° C. Conventional margarines at 15° may match oil at 13 or 14° C. The tests are conveniently carried out with the sample at 15° C. but coolness persists (to a lesser degree) when the sample is at 20° C. and is matched with oil one to three degrees cooler.

It has now been found that cool tasting margarines (sometimes cooler than butter) can be obtained when the total fat has the following dilatations: at 37° C. below 40, at 30° C. not greater than 150 and preferably not greater than 100, at 25° C. not greater than 350 and preferably not greater than 300, at 15° C. at least 350 units higher than at 25° C., at least the major proportion of said fat consisting of one or more lower-melting fractions of semi-soft fats (that is, fats which are solid at 15° C., melt gradually and are completely liquid at 55° C.), each of the said lower-melting fractions being obtainable by removing from a semi-soft fat a top-melting fraction containing substantially all the trisaturated glycerides therein, and any trisaturated glycerides present in significant proportions in said total fat being derived from coconut oil or palm kernel oil.

For defining the semi-soft fat "solid" means of dilatation at least 500; "completely liquid" means of zero dilatation; and "melting gradually" means having a dilatation at 30° C. of at least 180 and at 35° C. of at least 100. The dilatations referred to herein are those determined by the method which will be described below.

Margarines in which the total fat has the combination of dilatation values specified above are thought to be broadly novel.

One method of obtaining a suitable mixture of fat fractions is to "top" a semi-soft fat by cooling it, with stirring, from the completely liquid condition to a temperature within the range 25 to 40° C., generally 32 to 35° C., holding at such a temperature for a suitable period, and removing the crystals separating. To ensure crystals which may be satisfactorily separated, the agitation should not be too vigorous.

Although margarines in which the fat phase consists of topped palm oil have the desirable cool tasting properties referred to above, they are difficult to process by standard continuous methods and they exhibit post-hardening. This is because there are glycerides in topped palm oil which crystallise abnormally slowly as a result of which further crystallisation tends to occur after packaging the margarine, which leads to an undesirable progressive hardening thereof. We have found that this slowness in crystallisation can be avoided by using instead of topped palm oil alone a blend thereof with a fat which is itself rapid in crystallisation and does not mask the cool tasting effect of the topped palm oil. A typical lard having a dilatation at 20° C. of about 650 crystallises more readily than topped palm oil, but when present in admixture with a fat which gives a cool tasting effect when used alone, it tends to mask that effect to an extent depending on the proportion in which it is present. Thus for example a 50% blend of lard with topped palm oil was found to be much less cool tasting than topped palm oil, although it was easier to process on account of more rapid crystallisation.

We have found that lard forms with topped palm oil blends which at temperatures from 0° C. up to 25° C. show dilatation maxima at about 50% of the topped palm oil. This enables a liquid oil to be incorporated in the blend without undesirably softening the margarine. Thus for instance a margarine can be made with a fat phase consisting of about 60 to 70% of topped palm oil, about 15 to 25% lard and the remainder groundnut oil. From such blends we have made margarines which have the cool tasting property, though to a less extent than when topped palm oil is used as the sole fat, and which are somewhat more rapid in crystallisation than when topped palm oil is used alone. As a result of the improved rate of crystallisation the margarines were just packable but still exhibited post-hardening.

By topping lard of the kind referred to above at a temperature of 32° C. a fat is obtained which crystallises at almost the same rate as the whole lard, is cool tasting, although less so than topped palm oil, and does not mask the cool-tasting effects of other fats with which it is blended. Like whole lard, topped lard forms mixtures of maximum dilatation with topped palm oil at temperatures between 0 and 25° C. so that a liquid oil such as groundnut oil can be also included in the blend.

Margarines having a cool tasting effect have also been made by using as the fat phase a product obtained by hardening a highly unsaturated oil to give a semi-soft fat as defined above and topping this oil at a temperature in the neighbourhood of 35° C. Such a fat may be made for instance from marine oil hardened to a slip-point (defined below) of 35° C. Margarines which were cool-tasting have been made using a topped oil of this kind blended with topped palm oil and/or topped lard with or without liquid oil. A particularly advantageous method of obtaining a suitable fat blend is to top a mixture of palm oil and such a hardened oil, with or without lard or other semi-soft fat. If necessary to obtain the desired dilatation palm kernel oil and/or coconut oil can also be added to the topped blend, and to improve flavour a small proportion of butter may be incorporated.

In addition to the properties referred to above it is desirable, to ensure a satisfactory range of spreadability in the margarine, for the fat to have a dilatation at 10° C. not greater than 900 and at 20° C. not less than 400.

The dilatation or isothermal melting expansion of a fat is the volume increase, which is expressed in $mm.^3$, determined under the conditions of the following procedure and referred to 25 g., the reference temperature being given.

The dilatometer is of glass and consists of a vertical graduated capillary tube joined at its lower end by a U-shaped capillary tube to a glass bulb surmounted by a neck which is internally ground to take a hollow ground glass stopper. The height (above the lowest point of the U-shaped capillary) of the top of the graduated tube and the top of the mouth of the bulb are 350 mm. and 70 mm. respectively. The graduations extend over a length of 250 to 290 mm., and start 1 cm. from the upper end of the tube. The graduations are marked in intervals of 5 mm.³ (accurately calibrated) and cover a total volume of 900 mm.³. The internal diameter of the bulb is 20 mm. and it has a volume of 7 ml. (tolerance ±0.5 ml.). The internally ground neck of the bulb tapers downwards from an internal diameter of 15 mm. to an internal diameter of 12 mm. and is 26 mm. long. The bulb of the instrument is thus below the level of the graduations on the capillary tubing. The stopper to be inserted in the mouth of the bulb is about 95 mm. in length (including the ground portion), and is hollow and is partly filled with lead shot to hold it firmly in position while a dilatation is being determined.

1.5 ml. of well boiled distilled water containing a little blue ink is pipetted into the bulb of the dilatometer. The dilatometer is then weighed. A sample of the fat to be examined is thoroughly de-gassed by heating at 100° C. under vacuum. The fat (at about 60° C.) is then poured into the bulb of the dilatometer and the ground glass stopper is inserted, care being taken not to include any air. The amount of fat added is such that, during the determination, the level of water never falls below the lowest of the graduations. If the initial water level on filling is about two thirds of the height of the graduated capillary, these conditions are usually fulfilled. The dilatometer is re-weighed to obtain the weight of fat added. The hollow stopper is then partly filled with lead shot. It is then placed in a water bath maintained at 60° C. (±0.1°) and a reading of the level of the water in the capillary is made. This is the "base reading," $R_{60}$.

The filled dilatometer is chilled in an ice/water bath for 1½ hours. It is then allowed to warm in a water bath at 15° overnight (about 16 hours). It is then again chilled in an ice/water bath for 1½ hours and then placed in a water bath at 10° C. (±0.1° C.), the dilatometer being immersed to such a depth that the water level is above the middle of the ground glass stopper.

The position of the water meniscus in the capillary is read every half hour until two successive readings differ by no more than 2 mm.³. The final reading ($R_t$) is used in the calculations.

A similar procedure is adopted for each temperature $t$ at which the dilatation is required. Thus, $R_{10}$, $R_{15}$, $R_{20}$, $R_{25}$, $R_{30}$ and $R_{37}$ are successively determined.

Finally the dilatometer is heated again to 60° C. and the "base reading" is re-determined. If the initial and final "base readings" differ by more than 2 mm.³ the whole operation must be repeated.

The value of the dilatation is calculated from the following formula:

$$D_t = \frac{25(R_{60} - R_t)}{W} - A$$

where:

$D_t$ = dilatation at $t°$ C.
$W$ = weight of fat taken in grams
$R_{60}$ = base reading (mm.³)
$R_t$ = reading of the capillary at $t°$ C. (mm.³), and
$A$ is given in the table below.

| $t°$ C.: | A |
|---|---|
| 10 | 1080 |
| 15 | 975 |
| 20 | 870 |
| 25 | 765 |
| 30 | 660 |
| 37 | 513 |

The slip-point of a fat (sometimes termed the slip-melting point) is determined by heating a thin walled capillary (open at both ends) containing the solidified fat in a stirred water bath starting at 10° C. and increasing the temperature by 2° C. per minute, and noting the temperature at which the fat is seen to rise in the tube. The initially molten fat in the capillary is solidified by holding it for half an hour in an air bath at 15–17° C. It is immersed 3 cms. below the surface of the water during the determination.

The following examples illustrate the invention.

Example 1

Refined native Nigerian palm oil was topped by cooling from a temperature of 70° C. to 35° C., holding at that temperature for 6 hours and removing the crystals that separated.

| ° C. | 10 | 15 | 20 | 25 | 30 | 37 |
|---|---|---|---|---|---|---|
| Dilatations | 945 | 720 | 510 | 190 | 70 | 10 |

A margarine was made using as the fat phase the topped palm oil so obtained.

The margarine was thin melting and cool tasting and retained these properties to a satisfactory degree after storage for 5 days at 25° C. It exhibited post-hardening and was not spreadable at normal room temperature.

Example 2

A margarine was made using for the fat phase a 50% (by weight) mixture of the topped palm oil of Example 1 and a topped lard obtained by cooling lard from 70° C. to 34° C. holding at that temperature for 7 hours and removing the crystals.

| ° C. | 10 | 15 | 20 | 25 | 30 | 37 |
|---|---|---|---|---|---|---|
| Dilatations | 1,075 | 990 | 735 | 280 | 70 | 10 |

The margarine was cool tasting and thin melting though not quite to the same extent as that of Example 1, but it exhibited less post-hardening.

Example 3

A margarine was made using a fat of the following composition by weight:

67% topped palm oil (obtained as in Example 1)
20% lard
13% groundnut oil

| ° C. | 10 | 15 | 20 | 25 | 30 | 37 |
|---|---|---|---|---|---|---|
| Dilatations | 715 | 620 | 455 | 215 | 60 | 5 |

The margarine was cool tasting and thin melting and retained these properties well but there was some post-hardening.

Example 4

A fat blend of the following composition:

30% of hardened whale oil of slip point 35° C.
35% of palm oil
35% of lard was topped by cooling from 70° C. to 34° C., holding at that temperature for 6 hours and removing the crystals that separated. A margarine was made using as the fat the topped fat blend obtained as described above.

| ° C. | 10 | 15 | 20 | 25 | 30 | 37 |
|---|---|---|---|---|---|---|
| Dilatations | 940 | 825 | 590 | 270 | 75 | 10 |

The margarine was cool tasting and thin melting and retained these properties well on storage at 25° C. There was little post-hardening.

Example 5

A fat blend of the following composition:

45% of hardened whale oil of slip point 35° C.
45% of lard
10% of palm oil was topped as in Example 4.

From 85 to 90 parts of the topped blend and 15 to 10 parts of palm kernel oil (PKO) a final blend was made. Margarine in which this final blend was used to constitute the fat phase was found to be cool tasting and to exhibit little post-hardening.

| °C | 10 | 15 | 20 | 25 | 30 | 37 |
|---|---|---|---|---|---|---|
| Dilatations (with 15% PKO) | 855 | 755 | 510 | 310 | 110 | 35 |

Example 6

With 90 parts of the final blend of Example 5 there was incorporated 10 parts of butter. Margarine made with the resulting mixture constituting the fat phase was cool tasting and showed improved flavour compared with that of Example 5.

| °C | 10 | 15 | 20 | 25 | 30 | 37 |
|---|---|---|---|---|---|---|
| Dilatations | 800 | 675 | 480 | 290 | 105 | 15 |

Example 7

A blend was made consisting of:

60% of palm oil
40% of hardened whale oil of slip point 35° C.

This blend was topped at 35° C. and 10 to 15 parts of palm kernel oil were incorporated with 90 to 85 parts of the topped blend.

A cool melting margarine showing little post-hardening was made from the final blend.

| °C | 10 | 15 | 20 | 25 | 30 | 37 |
|---|---|---|---|---|---|---|
| Dilatations (15% PKO) | 925 | 690 | 490 | 240 | 105 | 15 |

Instead of the hardened whale oil of these examples other semi-soft fats made by hardening unsaturated oils, for instance fish oils, soya bean oil, groundnut oil and cottonseed oils hardened to slip points of 30–40° C., preferably 33 to 35° C., can be used. Coconut oil can be used instead of palm kernel oil and groundnut oil can be replaced by other edible liquid vegetable oils. The invention includes the use also of interesterified fats in forming the fat blend to be topped. Thus in place of whole lard interesterified lard can be used.

Preferably, in the margarines of the invention, at least 85% of the total fat consists of a mixture of a lower-melting fraction of palm oil with a lower-melting fraction of lard and/or with a lower-melting fraction of a liquid oil hardened to a slip point of 33 to 35° C., any other constituents of said total fat being composed of palm kernel oil or coconut oil and/or a liquid vegetable oil. The said mixture may for instance consist of lower-melting fractions of palm oil and of lard, the palm oil fraction amounting to at least 50%, for instance 60 to 75%, of the mixture. Or it may with advantage be composed of lower-melting fractions of mixtures of palm oil with a liquid oil hardened to a slip point of 33 to 35° C., in proportions between 1:1 and 2:1 and especially in proportions of approximately 3:2. A further very valuable series of mixtures are those composed of lower-melting fractions of mixtures of palm oil, with lard and a liquid oil, especially a marine oil, hardened to a slip point of 33 to 35° C., in relative proportions of about 10:45:45.

Margarines in which the total fat contains relatively high proportions of fractions both of lard and of palm oil tend to develop a grainy structure under certain conditions of storage, for instance when subjected to alternating conditions of high and low temperature. This tendency which may be found for instance in the margarine of Examples 2 and 4, may be avoided by limiting the proportion of palm oil fraction in such mixtures to below 20% as, for instance, in Example 5. In such mixtures proportions of 8 to 20, especially 10 to 15% of palm oil fraction are very suitable, the remainder preferably consisting of a mixture of lard fraction and a hardened marine oil fraction in substantially equal proportions.

The invention includes the novel fat blends as well as their preparation and solid fat-and-water emulsions such as margarine containing them.

We claim:

1. Cool tasting margarine in which the total fat has the following dilatations: at 37° C. below 40, at 30° C. below 150, at 25° C. below 350 and at 15° C. at least 350 units higher than at 25° C., said total fat consisting of 0 to 10% of butter and 100 to 90% of a fat composition which is substantially free from trisaturated glycerides other than those characteristic of palm kernel oil and coconut oil, said fat composition the lower melting moiety of a fractionated mixture of palm oil and an oil selected from the class consisting of lard and liquid oils hardened to a slip-melting point of 33 to 35° C., said mixture being at least the major proportion of said total fat, all percentages being by weight.

2. The margarine according to claim 1 in which at least 85% of said total fat consists of the lower melting moiety of a fractionated mixture of 50% to 75% palm oil and 25% to 50% lard.

3. The margarine according to claim 1 in which at least 85% of said total fat consists of the lower melting moiety of a fractionated mixture of palm oil and a liquid oil hardened to a slip-melting point of 33 to 35° C. in proportions ranging from 1:1 to 2:1 by weight.

4. The margarine according to claim 1 in which at least 85% of said total fat consists of the lower melting moiety of a fractionated mixture of palm oil, lard and a liquid oil hardened to a slip-melting point of 33 to 35° C., said palm oil being 10 to 15% of said mixture, the remainder of said mixture being equal proportions of said lard and said hardened oil.

5. A margarine in which the total fat has the following dilatations: at 37° C. below 40, at 30° C. below 150, at 25° C. below 350 and at 15° C. at least 350 units higher than at 25° C., said total fat consisting of 0 to 10% of butter and 100 to 90% of a fat composition which consists of a mixture in equal proportions of the moieties of palm oil and lard that remains liquid when the palm oil and lard are cooled from about 70° C. to about 35° C. and allowed to stand at the temperature to which they are cooled until crystallization is complete, all proportions being by weight.

6. A margarine in which the total fat has the following dilatations: at 37° C. below 40, at 30° C. below 150, at 25° C. below 350 and at 15° C. at least 350 units higher than at 25° C., said total fat consisting of 0 to 10% of butter and 100 to 90% of a fat composition which consists of a mixture of 60 to 70% of the moiety of palm oil that remains liquid when the oil is cooled from about 70° C. to about 35° C. and allowed to stand at the temperature to which it is cooled until crystallization is complete, 15 to 25% of lard and the remainder of groundnut oil, all percentages being by weight.

7. A margarine in which the total fat has the following dilatations: at 37° C. below 40, at 30° C. below 150, at 25° C. below 350 and at 15° C. at least 350 units higher than at 25° C., said total fat consisting of 0 to 10% of butter and 100 to 90% of a fat composition which consists of the moiety that remains liquid when a mixture of palm oil, lard and a marine oil hardened to a slip-melting point of about 35° C. in porportions of 10:45:45, respectively, is cooled from about 70 to about 34° C. and allowed to stand at the temperature to which it is cooled until crystallization is complete, all proportions being by weight.

8. The margarine according to claim 1 in which the said moiety mixture is a mixture of independently topped oils.

9. The margarine according to claim 1 in which the said moiety mixture is a mixture of oils which has been subsequently topped.

10. The margarine according to claim 1 in which the total fat consists of 0 to 10 parts of butter and 100 to 90 parts of a fat composition consisting of 10 to 15% of palm kernel oil and 90 to 85% of the fraction that remains liquid when a mixture of 10 to 15% palm oil and the remainder of lard and a marine oil hardened to a slip-melting point of about 35° C. in equal proportions is cooled from a temperature of about 70° C. to about 35° C. and allowed to stand at the temperature to which it is cooled until crystallization is complete.

11. The margarine according to claim 1 in which the total fat consists of 10 to 15 parts of palm kernel oil and 85 to 90 parts of the fraction that remains liquid when a mixture of palm oil and a marine oil hardened to a slip-melting point of about 35° C. in proportions of 3:2 is cooled from a temperature of about 70° C. to about 35° C. and allowed to stand at the temperature to which it is cooled until crystallization is complete.

References Cited by the Examiner
UNITED STATES PATENTS

| | | | |
|---|---|---|---|
| 2,442,532 | 6/48 | Eckey | 99—118 X |
| 2,592,224 | 4/52 | Wilson et al. | 99—122 |
| 2,657,995 | 11/53 | Blum | 99—118 |
| 2,684,377 | 7/54 | Skau | 99—118 X |
| 2,903,363 | 9/59 | Farr | 99—118 |

A. LOUIS MONACELL, *Primary Examiner.*
ABRAHAM H. WINKELSTEIN, *Examiner.*

UNITED STATES PATENT OFFICE
CERTIFICATE OF CORRECTION

Patent No. 3,189,465                                  June 15, 1965

Henry Bowen Oakley et al.

It is hereby certified that error appears in the above numbered patent requiring correction and that the said Letters Patent should read as corrected below.

Column 6, line 24, after "composition" insert -- comprising --; column 7, line 19, for "35° C." read -- 34° C. --.

Signed and sealed this 16th day of November 1965.

(SEAL)
Attest:

ERNEST W. SWIDER                                 EDWARD J. BRENNER
Attesting Officer                                     Commissioner of Patents